(Specimens.)
O. NAGEL
PROCESS OF MAKING ARTIFICIAL CAMPHOR.
No. 582,221.  Patented May 11, 1897.
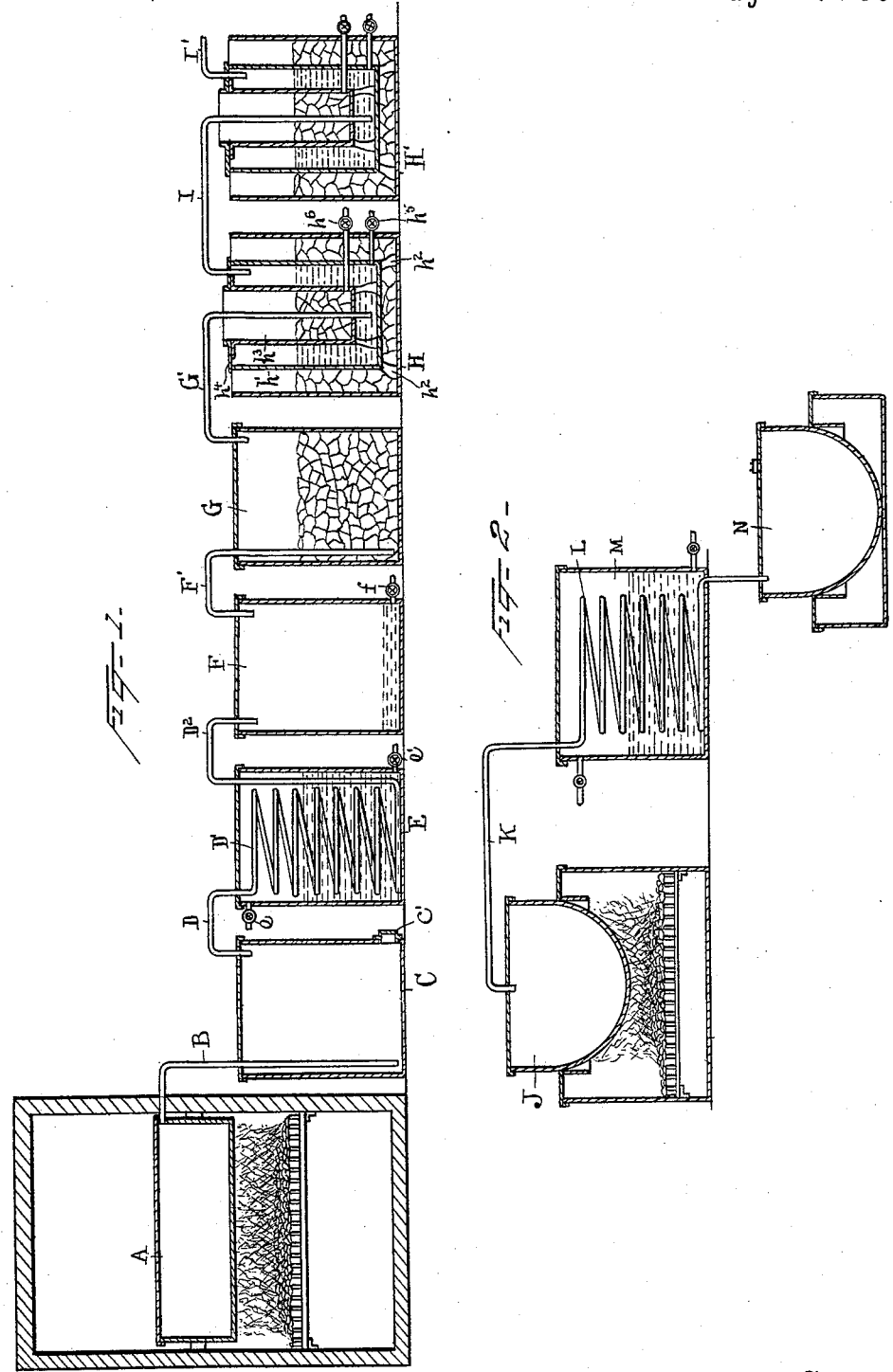

UNITED STATES PATENT OFFICE.

OSKAR NAGEL, OF VIENNA, AUSTRIA-HUNGARY.

PROCESS OF MAKING ARTIFICIAL CAMPHOR.

SPECIFICATION forming part of Letters Patent No. 582,221, dated May 11, 1897.

Application filed October 15, 1895. Serial No. 565,712. (Specimens.)

*To all whom it may concern:*

Be it known that I, OSKAR NAGEL, a subject of the Emperor of Austria-Hungary, residing in Vienna, Austria-Hungary, have invented a certain new and useful Improvement in Processes of Producing Camphor Artificially, of which the following is a specification.

I am aware that since early in the present century it has been known that a product sometimes called "artificial camphor" could be produced in the laboratory by passing hydrochloric acid through turpentine until the latter was saturated. The product, however, was not camphor, nor artificial camphor, but a hydrochlorinated terpene ($C_{10}H_{16}HCl$.) A method or process for producing this substance in a certain and economical manner in quantities and continuously was, however, not known or practiced, nor was it known that it could be converted into camphor. I have discovered that camphor can be made from hydrochlorinated terpene. I have also devised a process whereby this discovery is made available beyond mere laboratory work, whereby the production of camphor artificially may be carried on on a commercial scale in an economic, safe, and certain manner.

The main object of my invention is the production, in quantities and continuously, in an economical manner, of hydrochlorinated terpene ($C_{10}H_{16}HCl$) and its subsequent conversion into true camphor ($C_{10}H_{16}O$) in a simple and economical manner.

Another object of my invention is the production, in a simple, efficient, and economical manner, of an anhydrous hydrochloric acid for use in the process of making camphor.

In carrying out my invention I employ anhydrous hydrochloric acid and anhydrous turpentine. When both these substances are anhydrous, the results of the process are absolutely insured and the yield is large, whereas if either be not in the anhydrous state the process may fail entirely or, by chance, a small yield be obtained. It is my belief that the failure to apply on a commercial scale the laboratory knowledge regarding the reaction of these substances lies in the fact, principally, that it was not known that both should be as nearly as possible in an anhydrous state. While a slight departure from an absolutely anhydrous state in either of the materials named will not cause a failure of the process entirely, the yield will be less and the time consumed in the operation increased. Another probable reason why the laboratory knowledge referred to has not been commercially employed is due to the fact that no method was known for producing an anhydrous hydrochloric-acid gas in an economical and rapid manner on a commercial scale.

In carrying out my invention I first produce hydrochloric-acid gas, and then by the following steps, new to me, thoroughly dry the same. The gas is produced economically by the chemical combination of sea-salt and sulfuric acid under slow heat. The advantage of using the sea-salt is rapidity of action, large yield, and valuable by-products. The gas generated passes off, carrying with it certain heavy bodies, such as Glauber salt and sulfuric acid, which I catch in a tank provided for that purpose. I then pass the gas through a worm surrounded by circulating water at a temperature of about 40° Fahrenheit, whereby the moisture carried in the gas will be condensed and deposited in a vessel, into which the gas is caused to pass from the worm. The cooler the water circulating about this worm is the greater will be the condensation, providing, however, the freezing-point is not reached; but if the temperature of the water be, say, within the region of 70° Fahrenheit some condensation will still take place, but not as much as when a lower degree is employed. The process of drying the gas might stop here, but for still greater security I prefer to pass the gas through chlorid of calcium.

The turpentine, which may be any pure commercial article, is made anhydrous by adding chlorid of calcium, which absorbs the water contained in the turpentine, and which is separated by filtration.

Having now an anhydrous hydrochloric-acid gas and an anhydrous turpentine, the former is passed through the latter until the saturating-point is reached. During the passage of the gas through the turpentine both are cooled by a refrigerating agent—as, for instance, ice and salt—although the process may be carried on by cooling merely the turpentine, though in that event the operation will be slower and the yield somewhat less.

When the point of saturation is reached, there will be found in the vessel in which the operation is being carried on a crystalline substance and a heavy liquid, the latter of which is pumped off and filtered to obtain the crystals held in solution. These crystals and the crystalline precipitate are the hydrochlorinated terpene, ($C_{10}H_{16}HCl$,) the production of which has been heretofore known only as a laboratory work or experiment. These crystals are then recrystallized with benzin or washed with alcohol.

To convert the crystals into camphor, I first mix the same with lime, using about three parts, by weight, of crystals to one of lime, then distilling and producing camphene ($C_{10}H_{16}$) and, as a by-product, chlorid of calcium. The camphene is then treated with nitric acid, which is cheap, under moderate heat, whereby oxygen is freed and taken up by the camphene, the result being camphor, ($C_{10}H_{16}O$.)

I will describe my process more particularly in connection with the accompanying diagrammatic drawings, in which—

Figure 1 shows more particularly the apparatus for producing the anhydrous gas and combining it subsequently with the turpentine, and Fig. 2 shows more particularly the apparatus employed in the further steps of the process for converting the product produced by the apparatus of Fig. 1 into camphor.

The retort A is charged with sulfuric acid and "extracted" salt in the proportion of about one hundred and twenty-eight parts sulfuric acid and one hundred and sixty parts salt. A slow fire is maintained under the retort A, and as the gas is given off it passes from said retort by a pipe B into the closed tank C. Some heavy products are also carried over in suspension with the gas and are deposited in the tank C, being withdrawn therefrom from time to time through the manhole $c'$. The hydrochloric-acid gas, having been freed from such heavy products as have been carried over by depositing them in the tank C, passes from said tank through the pipe D, which may connect with or be formed into the worm $D'$, located in the tank E, around which worm a constant circulation of water is kept up by the pipes $e$ and $e'$, being, respectively, the supply and discharge pipes. In this worm the gas is cooled, the circulating medium being maintained, preferably, at a temperature of about 40° Fahrenheit. The delivery end $D^2$ of the worm discharges into closed tank F, as shown. In this tank the moisture condensed by the lowered temperature in the tank E will separate from the hydrochloric-acid gas and be deposited therein, from which it may be drawn off through the pipe $f$. The gas thus dried passes off through the pipe $F'$, and, being now quite anhydrous, may be employed directly in the subsequent steps of the process, although I prefer to pass the same through a tank G, containing chlorid of calcium, which still further dries the gas.

Thus far the process relates to the production of hydrochloric-acid gas. The use of this gas with turpentine to produce hydrochlorinated terpene will now be explained. From the tank G the thoroughly-dried gas is caused to pass through a pipe $G'$ to be combined with the turpentine. The tank in which the combination is effected may be composed of an outer or main tank H, of wood, and an inner or lead tank $h'$, provided with legs $h^2$, which rest on the bottom of the outer tank H, so as to raise the bottom of the tank $h'$ considerably above the bottom of the outer tank. Within the lead tank $h'$ is another lead tank $h^3$, also provided with legs, so as to raise its bottom above the bottom of the tank $h'$, the latter tank being preferably supplied with a tight cover $h^4$.

The outer tank H is designed to receive a refrigerant, as ice or ice and salt, the purpose of which is to keep the mixture in the tank $h'$ cool. $h^5$ is a tap by which the water may be drawn from the tank H. The vessel $h'$ is to receive the turpentine. Into it the hydrochloric-acid gas may be directly discharged, although I prefer to employ the inner tank $h^3$ for the purpose of holding ice, as shown, so as to secure, as far as possible, an equable temperature of the turpentine by cooling at its center. Preferably, also, the pipe $G'$, conveying the hydrochloric-acid gas to the turpentine, is caused to pass through the ice in the center of the tank $h^3$, as shown, and thus it enters the turpentine at a reduced temperature. A tap $h^6$ is provided for drawing off the water from the tank $h^3$. A series of tanks, arranged in the same manner as the tank H and its inner tanks, may be located in series, so that the unabsorbed hydrochloric-acid gas may be utilized. I have shown but one of such tanks, which I have lettered $H'$, the hydrochloric-acid gas passing from the tank H by the pipe I, as shown, into the turpentine in the said tank $H'$, the arrangement for cooling the gas and turpentine being identical with that described in connection with the tank H.

When the turpentine has been thoroughly saturated with hydrochloric-acid gas, it will form a precipitate on the sides of the vessel, with a remaining thick liquid holding some crystals in solution. This liquid should be pumped off and filtered to recover these crystals, and with the crystals precipitated should be recrystallized with benzin or washed with alcohol. The crystals are then transferred to a vessel J and lime is added in the proportion of about three parts, by weight, to one of lime. The mixture is then distilled, the gas passing off through the pipe K, which is thrown into the worm L, located in the tank M, in which a constant circulation of cold water is maintained, depositing in the vessel or tank M as camphene, ($C_{10}H_{16}$.) This camphene is then treated in the vessel N or elsewhere by adding thereto, preferably, nitric acid, although other oxidizers, such as chromic acid, ozone, permanganate of potash, &c., may be employed, the drawback being their expense. When chromic acid is employed, I prefer to employ two parts of camphene, one part of chromic acid, and ten parts of water. A moderate heat may be applied and the oxygen of the chromic acid will combine with the camphene, producing camphor, ($C_{10}H_{16}O$.) This product will be found usually somewhat dirty and may be cleaned in any suitable manner, the result being a body of crystals which may be compressed into a solid, if desired, to take the form in which natural camphor is found in commerce.

I claim—

1. The process of producing hydrochlorinated terpene ($C_{10}H_{16}HCl$) which consists in saturating anhydrous turpentine with anhydrous hydrochloric-acid gas while the turpentine is cooled by ice, substantially as set forth.

2. The process of producing hydrochlorinated terpene ($C_{10}H_{16}HCl$) which consists in saturating anhydrous turpentine with anhydrous hydrochloric-acid gas while the turpentine and gas are both cooled by ice, substantially as set forth.

3. The process of producing camphor artificially which consists in saturating turpentine with hydrochloric-acid gas, treating the resulting crystals with lime to remove chlorin, substantially as set forth.

4. The process of producing camphor artificially which consists in saturating turpentine with hydrochloric-acid gas, treating the resulting crystals with lime to remove chlorin, and subsequently oxidizing the same, substantially as set forth.

5. The process of producing camphor artificially which consists in saturating turpentine with hydrochloric-acid gas, treating the resulting crystals with lime to remove chlorin, and subsequently oxidizing by the addition of nitric acid, substantially as set forth.

This specification signed and witnessed this 5th day of October, 1895.

OSKAR NAGEL.

Witnesses:
 EUGENE CONRAN,
 JOHN R. TAYLOR.